MOVABLE INDEX LINE MECHANISM

Filed May 29, 1953 4 Sheets-Sheet 1

INVENTOR.
CHARLES W. TURLEY
BY
Reynolds, Beach & Christensen
ATTORNEYS

INVENTOR.
CHARLES W. TURLEY
BY
Reynolds, Beach & Christensen
ATTORNEYS

INVENTOR.
CHARLES W. TURLEY
BY
Reynolds, Beach & Christenson
ATTORNEYS

Dec. 7, 1954 C. W. TURLEY 2,696,610

MOVABLE INDEX LINE MECHANISM

Filed May 29, 1953 4 Sheets-Sheet 4

INVENTOR.
CHARLES W. TURLEY
BY
Reynolds, Beach & Christensen
ATTORNEYS

United States Patent Office 2,696,610

Patented Dec. 7, 1954

2,696,610

MOVABLE INDEX LINE MECHANISM

Charles W. Turley, Monroe, Wash.

Application May 29, 1953, Serial No. 358,501

20 Claims. (Cl. 340—368)

This invention relates to a movable index line mechanism and more particularly to a device which may be superpositioned on a radar plan position indicator (P. P. I.) screen as a means of marking or producing a straight reference line extending across the face of the screen in any desired location and direction thereon. While the invention is herein illustratively described in its presently preferred form as applied to radar indicators and the like, it will be readily appreciated that it has a number of other uses and may assume a variety of modified forms mechanically which employ the characterizing features of the invention.

As later explained herein by way of example there are a number of situations in the use of radar wherein a device of the presently disclosed type has great utility. In essence it constitutes a flexible instrument or tool which may be utilized in the interpretation and utilization of the radar signal representations appearing on the radar screen in a manner producing consistently accurate results and permitting calculations and reckonings to be made much more quickly than with currently available facilities. Moreover such mechanism is so constructed and arranged that the variable index line itself, which may be made of inappreciable thickness, yet visible, need be the only element of the mechanism which actually overlies the radar screen, so that no portion of the screen is masked or obscured. Moreover, when the device is not in use, even the movable index line element itself may be shifted off to the side where it will not appear over the screen and cause possible confusion or present a physical obstruction.

Another object of the invention is a compact movable index line mechanism wherein the index line is conveniently adjustable to any desired angular position by means of a single control knob, or the like, and wherein the means for adjusting the line in respect to angle are independent of those for adjusting the same in translation, i. e. parallel to itself, so that the making of one type of adjustment will not disturb the position or attitude of the line in respect to the other type.

Still another object of the invention is a device of the character described which is readily constructed in a manner conducive to precision work and cannot be easily damaged in a way harmful to the accuracy achieved.

Yet another object is a practicable device of the nature described in which the movable index line element is formed by a wire, fine cord, or chain, for instance, instead of as the edge of a strip or plate of considerable width as in the case of a conventional straight edge, or as a line marked on a transparent plate. Thus the masking effect of the body of a straight edge is avoided and the light reflections and partial masking effects of a transparent lined plate are also avoided. The invention makes possible the efficient use of a stretched cord or line of minute thickness by providing a compact and easily operated mechanism which enables the angular position and the translatory position of the cord, under tension, to be adjusted conveniently at will.

With the foregoing and other objects in view the improved movable index line mechanism as herein illustrated broadly comprises a pair of oppositely located line anchor elements guided for adjustive movement thereof in opposite senses in the same circular path, means operable for effecting such movement of the two anchor elements conjointly and at equal rates, and a line element or cord, preferably in the form of a fine chain, stretched under controlled tension in a straight line between such anchor elements and of variable length between such anchor elements to permit shifting such line parallel to itself as the anchor elements move relatively together or apart in following the circular path. As a further feature, distance variation between anchor elements is permitted by a spring-loaded reel associated with one of the anchor elements in order to pay out and take in the necessary amount of cord as said distance is adjustably varied. Still another feature resides in the provision of guide means for the anchor elements permitting conjoint circular movement thereof in the same sense, that is without any relative circular movement therebetween, in order to change the angular position of the chordally extending line without altering the length thereof stretched between the anchor elements.

Preferably the guide means referred to comprise a pair of circularly guided concentric rings provided with gear teeth and driven conjointly in opposite directions by intermeshed pinions rotated by the same adjustment knob. By this means the anchor elements always move at identical rates so that the variable index line remains constantly parallel to itself. By a further provision the two rings may be circularly shifted together in the same sense in either direction for changing the index line's angular position and this is preferably accomplished by separately selected gear means under control of the same adjustment knob as that producing lateral displacement of the index line element.

These and other features, objects and advantages of the invention, including certain details of construction of the preferred form, will become more fully evident from the following description by reference to the accompanying drawings.

Figures 8 to 11, inclusive, are simplified diagrams of a P. P. I. showing use of the movable index line invention for one type of radar navigational problem in which angular adjustability of the line may or may not come into play.

Figures 12 to 16, inclusive, are simplified diagrams of a P. P. I. showing use of the invention for a different type of radar navigational problem in which both translatory and angular adjustability of the line come into play.

Figure 1:
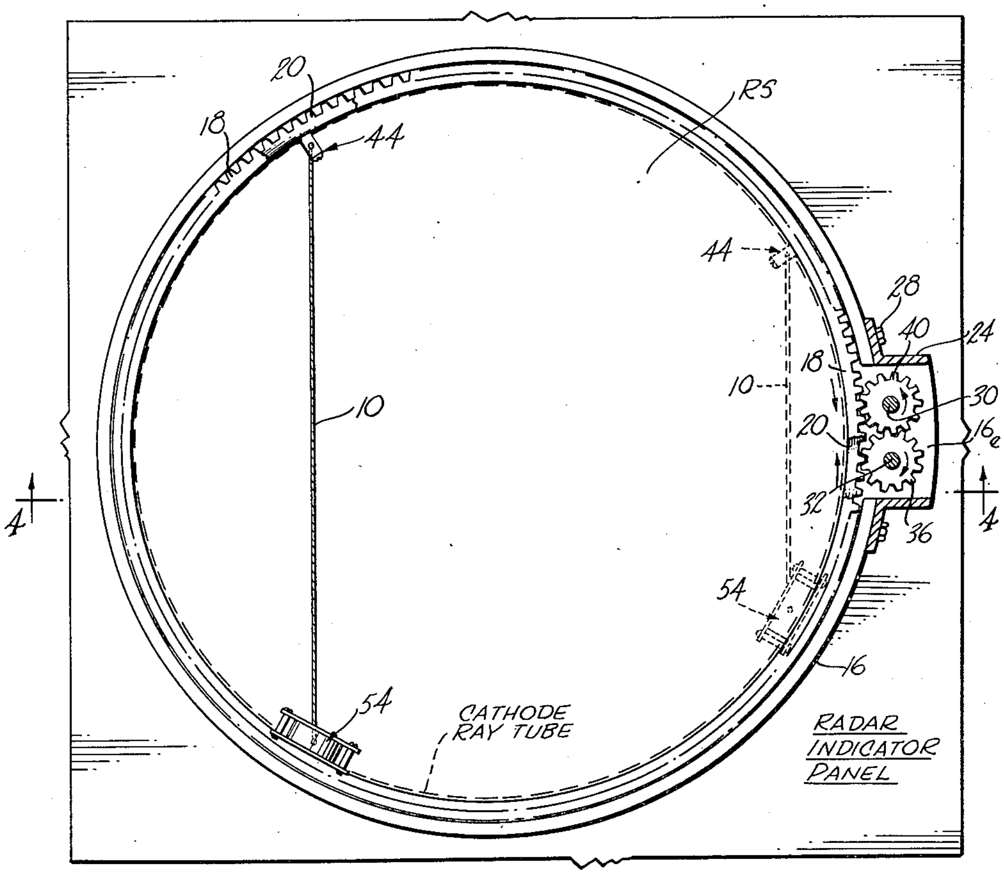
Figure 1 is a front view of a portion of a radar indicator panel upon which the movable index line mechanism is mounted.
Figure 2:
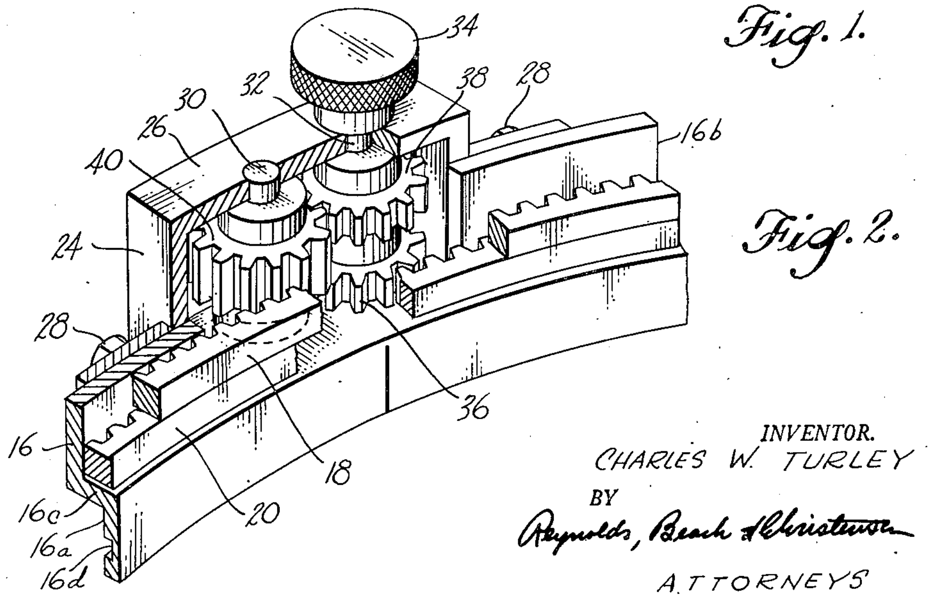
Figure 2 is an enlarged fragmentary perspective view, taken partly in section, of the adjustment knob and pinion gearing for shifting the guide rings.

In Figure 1 a portion of the radar indicator panel is shown which incorporates the usual features of a radar set including an opening therein for mounting a cathode ray tube having the circular screen RS. In the examples later described the radar indicator is assumed to be of the plan position type. According to the present invention a movable index line 10, preferably in the form of a fine gauge flexible metal chain, is superpositioned over the radar screen and occupies the position geometrically of the chord of the circular outline of the cathode ray tube screen. This variable index or chord line 10, supported at or outside the edges of the screen circle, may be moved either parallel to itself or through any desired angle of rotation about the center of the circle by the mechanism to be described. Instead of being a chain, the line element 10 may be formed by other types of lines, such as a woven thread, plastic monofilament, wire, etc.

In order to support the mechanism a circular frame 12 of a diameter somewhat larger than the cathode ray tube screen RS is mounted on the radar indicator panel to encircle the indicator screen. A circular glass plate 14 parallel to this screen seated in a groove around the inside periphery of the frame 12 protects the radar screen and serves as a window upon which markings may be made with a grease pencil if desired. For purposes of the invention, this glass plate is not essential, however. The variable index line 10 is preferably mounted in the mechanism to lie closely adjacent the outside face of this glass plate in order to minimize possible parallax.

An outer flange 12*a* on the circular frame 12 forms a second groove or step within the frame in which is received the complemental flange 16*a* of a circularly adjustable base ring 16, this latter ring being provided with a second flange 16*b* of larger diameter than the flange 16*a*, and an interconnecting web 16*c* parallel to the plane of the glass plate 14. The annular groove or reentrant corner defined between the flange 16*b* and the web 16*c* is provided to accommodate and serve as a circular guide for a pair of similar ring gears 18 and 20 mounted one directly upon the other for relative sliding in a circular sense. Retaining screws 22 in the frame flange 12*a* enter a groove 16*d* extending around the exterior of the base ring flange 16*a* and slide in this groove to permit rotational adjustment of the circular base ring relative to the circular frame while preventing withdrawal of the ring from the frame except upon retraction of the screws.

The ring gears 18 and 20 are of the external type and have an inside diameter or opening which is equal to or larger than the opening through the ring 16 and frame 12 so that a full view of the radar indicator screen RS is obtained directly through the assembly of aligned parts. In order to adjust or shift these ring gears by equal increments in opposite senses of rotation the mechanism includes pinion gearing mounted in a housing on one side of the base ring 16, such housing comprising a bottom formed as an ear 16*e* on the ring, opposite sides 24 and a bridging top 26. Secured to the flange 16*b* by the bolts 28, a pair of pinion shafts 30 and 32 mounted in spaced-apart parallel relationship perpendicular to the general plane of the ring gears are journalled in the top and bottom plates 26 and 16*e*, respectively, of the pinion housing. A control knob 34 fixed by a set screw on the upper end of the shaft 32 which projects through the housing top 26 may be rotated by hand in order to turn the shaft. This turns the pinion gear 36 secured to the shaft near its lower end and also turns the lower or inner ring gear 20 meshing with pinion gear 36. A second pinion gear 38 also mounted on the shaft 32 to be rotated thereby meshes with a third pinion gear 40 mounted on the second shaft 30 in a position to mesh with and drive the upper or outer ring gear 18. The two ring gears 18 and 20 have the same number of teeth and the pinions 36, 38 and 40 each have the same number of teeth. Thus when the control knob 34 is rotatively adjusted in one direction or the other the two ring gears 18 and 20 are moved by equal and opposite amounts in a circular sense about the inside periphery of the base ring 16.

Figure 3:
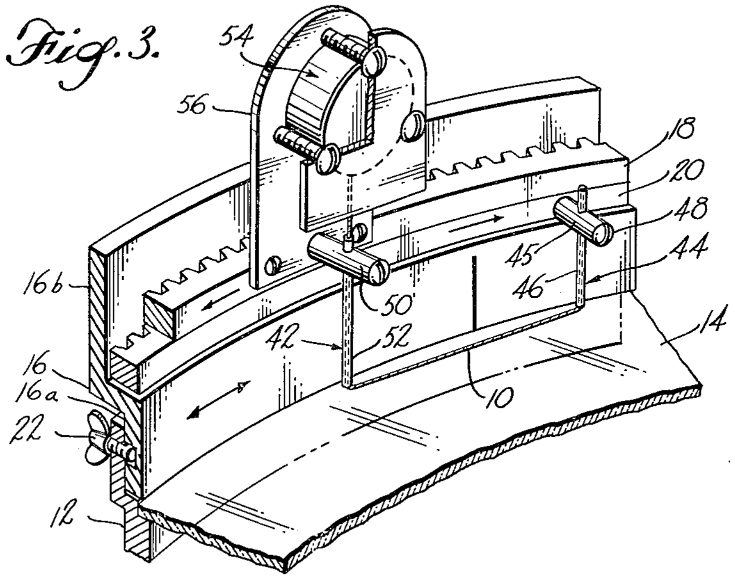
Figure 3 is an enlarged fragmentary perspective view particularly illustrating the anchor elements, the cord reel and their relationship to the circularly movable guide rings.

The two ring gears 18 and 20 comprise circular guides for the anchor elements 42 and 44, respectively, between which the variable chord line 10 is stretched overlying the glass plate 14 (Figure 3). The anchor element 44 comprises post 45 suitably fastened to the inside face of the ring gear 20 to project radially inward therefrom, and a line holder tube 46 received in an aperture intermediate the ends of the post 45 and held in this aperture by a set screw 48 to project downward toward the glass plate 14. The holder tube 46 is crimped on the line 10 and may be adjusted lengthwise of itself to place the stretch of line immediately adjacent the glass. The anchor element 42 comprises a post 50 similar to the post 45, and a holder tube 52 which in this case is different from the holder tube 46 in that the tube 52 has a bore therein sufficiently large to permit free sliding of the line 10 through the bore. The line 10 passes freely through the entire length of the tube 52 and is wound upon a spring-loaded reel mechanism 54 carried by a bracket or plate 56 which in turn is carried by the ring gear 18. The post 50 is mounted on this bracket in a position such that the line 10 in passing upwardly through the bore in the holder tube 52 extends directly to the take-up reel (not shown) in the mechanism 54. The details of this spring-loaded take-up reel mechanism are omitted from the description because they are or may be of a conventional nature. In essence the reel carrying the excess length of line 10 has a spring which maintains constant tension in the line throughout variations in the distance between the holder elements 46 and 52, although the tension is not great, or at least is insufficient to draw the two anchor elements 42 and 44 together by causing relative sliding of the ring gears 18 and 20 in any relatively adjusted position of the two ring gears. An elastic line of rubber or the like stretched between the anchor elements might be used in some cases and avoid the need for a take-up reel, the line stretching by varying amounts as the distance between anchor elements varies. Still other alternatives to the take-up reel, involving other expedients for feeding line and taking up line as said distance varies may also be devised.

It will thus be seen that the mechanism comprises two relatively rotatable guide rings 18 and 20, each of which carries a separate anchor element 42 and 44, respectively, for the variable length index line 10 stretched between the lower ends of these anchor elements in a position superposed over the radar indicator screen RS. By rotating the knob 34 in one direction or the other, the two anchor elements are caused to move in opposite directions around the same circle representing the locus of points traversed by the lower ends of the holder tubes 46 and 52, and the line 10 stretched between these tubes is thereby caused to move parallel to itself from one side of the circular opening or radar screen RS to the other. In its various adjusted positions effected by rotation of the knob 34 the line 10 defines successive parallel chords of the circle represented by the locus of points just mentioned. Suitable index means may be provided if desired in order to show in terms of numbers or other identifying means the instantaneous relative position of the line 10. Also suitable markings on the frame or base rings may be provided to show relative rotation angle of the base ring relative to the frame ring.

In order to change the angular position or orientation of the index line 10 relative to the radar screen, the knob 34 is released and the base ring 16 is grasped and shifted bodily in circular fashion about the central axis of the apparatus to any desired angular position, which may be viewed upon a suitable index scale if desired. During such movement of the base ring, the ring gears 18 and 20 remain stationary relative to each other and to the base ring. Likewise during rotation of the knob 34 effecting relative rotation of the ring gears 18 and 20, hence progressive transverse movement of the index line 10, the base ring itself remains stationary so that the angular position of the line remains constant.

Figure 6:
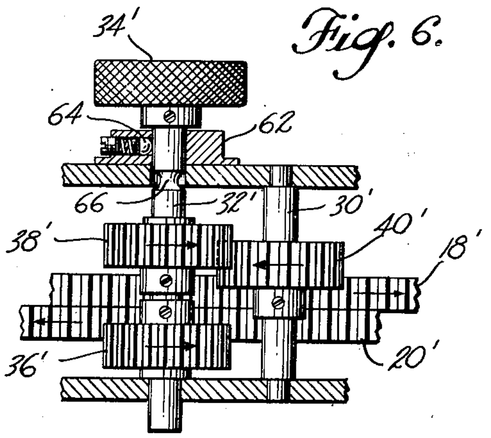
Figures 6 and 7 are similar sectional views taken on line 6, 7—6, 7 in Figure 5 to show different operating positions of the adjustment knob, which in this case controls both the angular position and the translatory position of the line.
Figure 7:
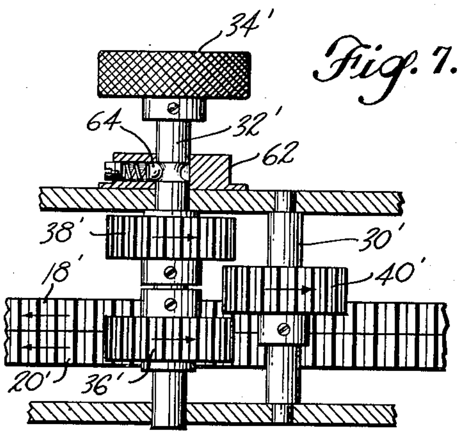
Figure 5:
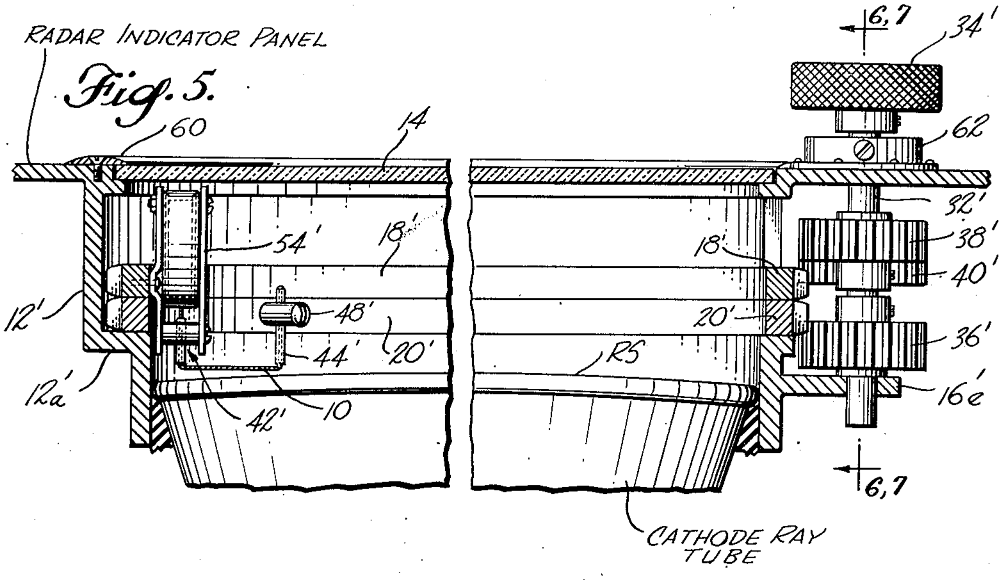
Figure 5 is a transverse sectional view of a modified form of the movable index line mechanism as installed in a radar indicator panel.

In the modified version appearing in Figures 5, 6, and 7, the mechanism is so adapted that angular movement of the variable index or chord line 10 is accomplished by means of the same control knob as that which accomplishes traversing movement of the line in a sense produced by relative rotation of the ring gears. In this case, therefore, it is possible to have the ring gears, pinion gearing and supporting frame means mounted beneath the radar indicator panel because it is unnecessary to rotate the entire base bodily in order to change the angle of the index line.

In this modified version the radar indicator panel has an inwardly projecting annular flange 12′ serving as the frame or base for the variable index line mechanism, and the protective glass plate 14′ is mounted flush with the face of the panel by means of the retaining ring 60. A shoulder 12′*a* extends around the flange 12′ and serves as an annular support for the two ring gears 18′ and 20′. The ring gear 18′ carries the take-up spring-loaded reel mechanism 54′ and the line holder 42′ corresponding to the take-up reel mechanism 54 and line holder 42, respectively, in Figure 3. The holder 44′ corresponds to the holder 44 in Figure 3. The line element itself is marked with the same reference numeral, 10, as in the preceding form. In this case the holder elements 42′ and 44′ are so positioned by the respective supporting ring gears that the movable index line element 10 is maintained closely adjacent the surface of the radar screen itself, instead of being adjacent an intervening glass plate, as in the preceding form. As a result, somewhat greater acccuracy in the use of the variable index line as an instrument for interpreting the radar data appearing on the screen RS is possible because of the reduction of possible parallax errors.

The principal difference between the two forms, however, resides in the modified mechanical arrangement for moving the variable index line both in angle and in translation. In Figures 5 to 7 this control mechanism is operated entirely by means of the control knob 34' mounted on the upper end of a shaft 32'. The latter is mounted for both rotation and longitudinal movement in a journal or base 16e' and a support 62. A second shaft 30' is mounted for rotation only, parallel to the shaft 32'. The base 62 carries a spring-ball type detent 64 engageable in a groove or recess 66 in the shaft 32', when the shaft is raised by lifting on the control knob 34' in order to bring the groove into registry with the detent. Normally the shaft is in its lowered position as in Figure 6, in which positive rotation of the control knob causes the ring gears 18' and 20' to move oppositely at equal rates. Such rotation of the ring gears by means of the control knob is effected through the pinions 36', 38' and 40', corresponding respectively to those designated 36, 38 and 40 in the preceding form. However, by raising the control knob 34' to shift the shaft 32' upwardly and produce engagement of the detent 64 in the groove 66, the pinion 38' is disengaged from the pinion 40', and the pinion 36' is shifted from a position of engagement with the ring gear 20' to one of engagement with both of the gears 18' and 20'. Thus rotation of the control knob 34' in either direction causes the two ring gears to rotate simultaneously by equal amounts in the same direction.

It will be seen, therefore, that the gear mechanism serves as a means of effecting translational movement of the variable index line 10 parallel to itself with the knob and shaft positioned as in Figure 6, and of effecting angular shifting of the variable index line without changing its relative translated position (i. e. the distance between holder elements 42' and 44') when in the detent-engaged position shown in Figure 7.

Figure 8:
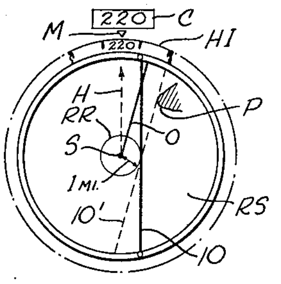

Figures 8 through 11 illustrate navigational use of the adjustable chord line for advanced distance-off marking in a typical situation which may be encountered. In the example the radar indicator is of the plan position (P. P. I.) type wherein the vessel's indicated position S is at the center of the radar screen RS and the vessel's heading is upward along a vertical diameter as represented by the arrow H. For convenience the compass heading, as derived from a gyro repeater, for instance, is indicated on the radar operator's instrument panel at C. In Figure 8 this compass heading is 220 degrees and a point of land P has appeared on the screen well ahead and off to the starboard of the vessel. The radar operator's task in this illustrative situation is that of giving the helmsman corrective compass headings from time to time as needed for guiding the vessel past the point P with a predetermined clearance. Obviously it is usually desirable from a navigation standpoint to begin correcting the vessel's heading relative to the point P as soon as the point is identified on the radar screen. The invention provides a convenient and accurate means of accomplishing that result by enabling the operator to establish a distance-off marking guide upon the indicator screen in advance of arrival at the navigation point.

Referring to Figure 8, as soon as the point P is located the operator adjusts the control (not shown) for the radar's calibrated variable range ring RR (formed as a circle of light on the P. P. I. screen) to a radius (assumed as one mile in the example) representing the desired distance off or clearance for passing the point P. The movable chord line 10, aligned vertically or parallel to the vessel's heading H, is then shifted laterally of itself until it is just tangent to the variable one-mile range ring RR on the starboard side of the radar screen. The revoluble bearing scale ring HI is then adjusted so that the ship's compass heading on the ring scale registers with the fixed dead-ahead marker M above the ring.

Figure 9:
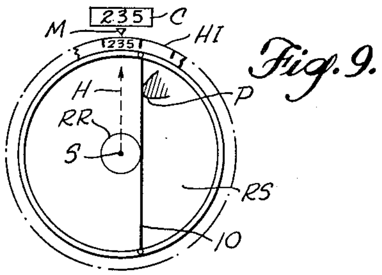
Figure 10:
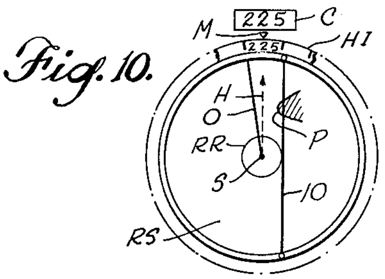

By then noting the position of the chord line 10 relative to the point of land P the operator can immediately determine whether the vessel's heading is either too far to the starboard or port for the vessel to pass the point P with the desired one mile clearance. By referring to the scale of heading numbers on the adjusted heading ring HI the operator can determine approximately, with or without the aid of the rotatable cursor O normally incorporated in a radar set of this general type, the desired heading to correct the vessel's course. In Figure 8 the vessel's heading is 220 degrees and the operator notes that the point P is well to the starboard of the chord line 10, so advises the helmsman to change the heading to a specified angle, such as 235 degrees, for example. In Figure 9 this new heading happens to establish the point P and chord line 10 in tangential relationship as desired, since if the vessel now were to continue in a straight course on its new heading it would ultimately pass the point with the desired one mile clearance. If the operator fails on the first estimate to give a correct new heading establishing at once the indicated relationship in Figure 9 the process is repeated and the desired result achieved by successive approximations.

Figure 11:
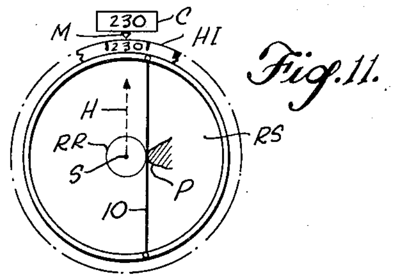

Cross currents, winds or inattention may cause the vessel to depart from the desired course and heading after a time as the vessel approaches the point P so that new corrections given by the radar operator to the helmsman become necessary. Thus at a later time in the illustrated case an error to the starboard is depicted in Figure 3 with the instantaneous heading at 225 degrees, a heading which if maintained would run the vessel aground. The operator now readjusts the heading scale ring to bring the heading angle of 225 degrees opposite the marker M and with this scale as a guide gives the helmsman a corrected course. By following this procedure repeatedly as necessary the radar operator causes the vessel to be guided past the point P with the desired one-mile clearance. In Figure 11 the point is just abeam and at that instant is tangential to the range ring RR left at the one-mile radius setting.

While throughout the foregoing described procedure the range ring and chord line 10 are both fixed and corrections of heading are derived more or less by eye, more accurate corrections may be determined with the aid of the adjsutable cursor O and chord line 10 by following a slightly more elaborate procedure which, incidentally, further demonstrates the versatility of the chord line device. Thus in order to derive a corrected heading from the situation presented in Figure 8 by this modified procedure the chord line 10 is rotated from its solid-line position to its dotted-line position 10' tangential to point P and to the range circle RR. It is then moved transversely to itself (to the left) into a parallel position intersecting the screen's center (or the cursor C is adjusted to this angular position by eye, for instance), and will automatically intersect the bearing scale ring HI at the corrected course heading, which may be read off to the helmsman. Thereupon the chord line is restored to its solid-line position 10 and the effect of the change of heading noted in order to determine whether the result indicated in Figure 9 is achieved.

Another use of the variable chord line device by radar operators is as an aid in determining the true course and speed of another vessel in the vicinity. The usual practice has been to follow the graphical method involving use of a so-called "maneuvering board" such as that published by the U. S. Navy Department Hydrographic Office. This is a chart containing a polar coordinate system in terms of range and bearing, and scales of multiplication and conversion of units. In order to use this chart the radar operator plots at least two successive relative positions of the other vessel at the beginning and end of a recorded time interval. The chart having these "fixes" of the other vessel as derived from the radar screen in the normal darkness of a radar room, is then taken to suitable quarters for tediously working out the solution of the problem and determine true course and speed of the other vessel.

The same information may be derived much more easily and quickly by use of the novel shifting chord line device comprising the present invention without benefit of a separate chart. One technique for so doing is illustrated in Figures 12 through 16 wherein the elements of the radar display are again illustrated in simplified manner.

Figure 4:
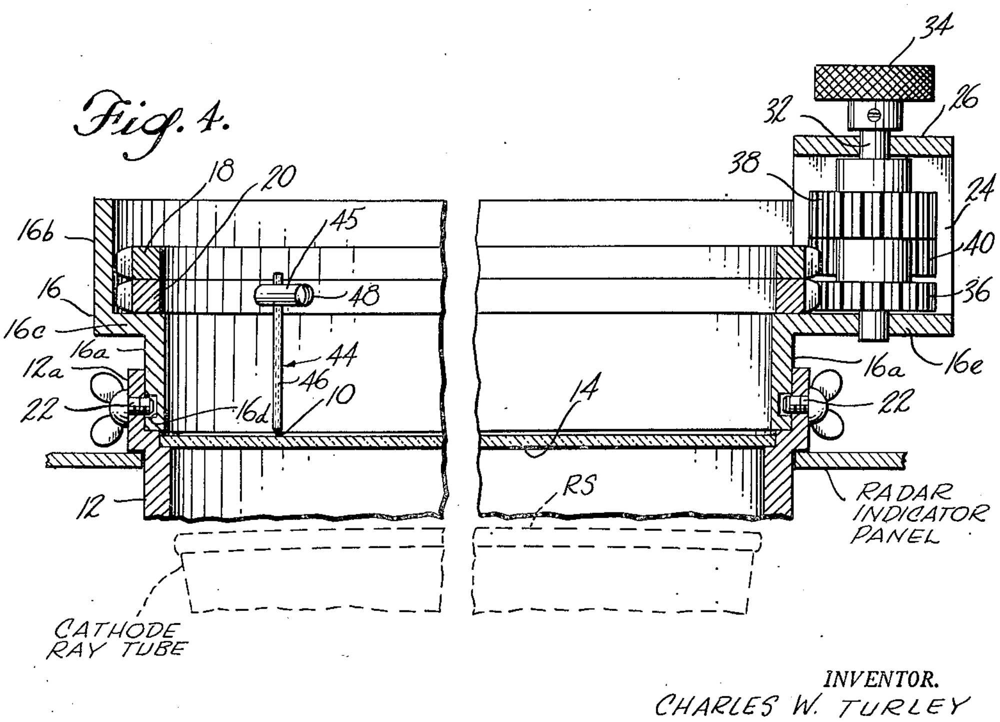
Figure 4 is a transverse sectional view taken on line 4—4 in Figure 1.
Figure 12:
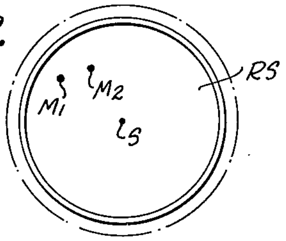
Figure 13:
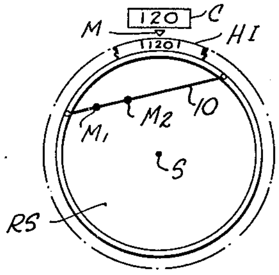
Figure 14:
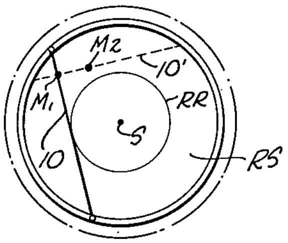
Figure 15:
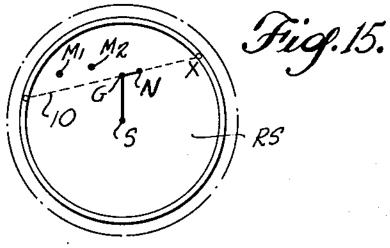
Figure 16:
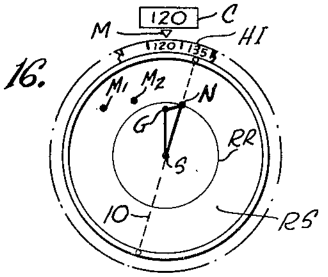

In Figure 12 the point M, represents the position of the other vessel at a time $t_1$ and is marked, as by a grease pencil, directly on the glass over the cathode ray tube screen or on the glass plate 14 (Figures 1 and 4). At a later time $t_2$ the other vessel's new position M2 is also marked on the screen. The next step is to run out the variable chord line 10 and swing it into the position 10' passing through points M1 and M2 and thereby representing the relative heading of the other vessel.

Next, the chord line 10 is swung through 90 degrees and shifted to intersect point M1, whereupon the variable range ring RR of the indicator is expanded to tangential relationship with the adjusted chord line, and the variable range ring indicator dial (not shown) on the radar panel is read. The chord line 10 is then shifted parallel to itself to intersect point M2 and the range ring control readjusted to tangency with it so as to obtain a second reading of the said range ring indicator dial. The difference between these two readings then constitutes the relative distance travelled by the other vessel in miles between positions M1 and M2 in the time interval $t_1$ to $t_2$. Relative speed of the other vessel is then simply that distance travelled divided by this travel time.

To continue, true course of the other vessel is also easily determined with the aid of the shifting chord line after the points M1 and M2 have been plotted as in Figure 12. This is carried out by drawing on the radar screen glass with a grease pencil a vector line S—G proportional in length to own vessel's speed (already known). The length of this vector may be set with the aid of the radar's variable range ring RR, by selecting a suitable scale ratio for interpreting the numbers of the variable range ring indicator dial. From point G, the terminus of such vector, a second line G—X is drawn parallel to the line of M1, M2. The direction of this line (G—X) is established by drawing along the variable chord line 10 after the latter has been oriented parallel to the line of M1 and M2, and the length of line G—M therealong is then established as a vector quantity representing relative speed of the other vessel simply by again using the radar's variable range ring indicator dial and the adjustable chord line 10. This is done by rotating the line 10 by 90 degrees and shifting it parallel to itself to intersect point G, upon which the variable range ring is adjusted to tangency with chord line 10, and its indicator dial read. To this reading is added a quantity representing relative speed of the other vessel, in the same units as those for establishing the length of line S—G, and the variable range ring is then adjusted to this new reading. The chord line 10 is then shifted parallel to itself to tangency with the newly adjusted range ring and its intersection N with line G—X marks off the vector length G—N proportional to relative vessel speed.

The vector resultant is then S—N and is indicated by chord line 10 shifted to pass through points S and N and represents true course of the other vessel (135 degrees in the example—Figure 16), which may be read directly from the scale of bearing ring HI coordinately adjusted to the reading of the gyro repeater dial C. True speed of the other vessel is represented by the length of vector resultant S—N and is measured by expanding the radar's variable range ring RR to intersect point M and interpreting the range ring dial indicator dial in the units being used.

The problem of determining true course and speed of another vessel for navigation purposes is thereby determined, especially after a little experience, quickly and easily with the novel variable index line device and existing component of a conventional radar set with which it is associated. The grease pencil markings are easily rubbed off the screen glass and the process repeated in other situations an indefinite number of times. In fact several such determinations may be carried out from "fixes" marked on the indicator screen at more or less the same time by a skilled operator.

Still other uses of the movable index or chord line mechanism may be readily visualized, either in the field of navigational devices or in other fields of endeavor, such as in the solution of various measuring, calibrating, gauging, or other problems wherein it is desired to provide a variable line which may be shifted parallel to itself into various positions or may be shifted in that sense as well as in a rotational sense relative to a selected center point. The term "radar" as herein used also connotes sonar and similar devices.

I claim as my invention:

1. Movable index line mechanism comprising a base, a pair of circular guide members rotatively carried by said base for rotation thereon about a common axis, variable-length index line means including anchor elements carried by the respective circular guide members in a common locus circle centered at said axis, and a variable-length line element stretched tautly between said anchor elements, and rotational drive means connected to both of said circular guide members operably to effect conjoint rotation thereof oppositely by equal amounts for moving said anchor elements equally and oppositely in said common locus circle, whereby said line element shifts in translation parallel to itself as a movable chord to such circle.

2. The mechanism defined in claim 1, wherein the circular guide members comprise ring gears and the rotational drive means comprises pinion gearing meshed with said ring gears, and a member for driving said pinion gearing.

3. The mechanism defined in claim 1, wherein the variable-length index line means includes a spring-loaded line element take-up reel carried by one of the circular guide members in association with the anchor element thereof, the line element comprising a flexible line guided for movement through the latter anchor element to wind and unwind from said reel as the distance between anchor elements varies.

4. The mechanism defined in claim 1, and means supporting the base and guiding the same for rotational shifting thereof about the common axis, the rotational drive means being carried by the base whereby the angular position of the movable line element may be varied without changing the relative translated position of the line element.

5. The mechanism defined in claim 4, wherein the circular guide members comprise ring gears and the rotational drive means comprises pinion gearing meshed with said ring gears, and a member for driving said pinion gearing.

6. The mechanism defined in claim 4, wherein the variable-length index line means includes a spring-loaded line element take-up reel carried by one of the circular guide members in association with the anchor element thereof, the line element comprising a flexible line guided for movement through the latter anchor element to wind and unwind from said reel as the distance between anchor elements varies.

7. The mechanism defined in claim 1, wherein the rotational drive means effecting conjoint opposite rotation of the circular guide members is disengageable therefrom to permit conjoint rotation thereof in the same sense, and independently operated rotational drive means releasably engageable with the circular guide members operably to effect conjoint rotation thereof in the same sense.

8. The mechanism defined in claim 7, wherein the first and second named rotational drive means are interconnected for positive release of one such means attending engagement of the other and conversely, whereby rotational drive of the circular guide members in the same sense may be effected without disturbing the rotated positions of such guide members relative to each other.

9. The mechanism defined in claim 8 wherein the variable-length index line means includes a spring-loaded line element take-up reel carried by one of the circular guide members in association with the anchor element thereof, the line element comprising a flexible line guided for movement through the latter anchor element to wind and unwind from said reel as the distance between anchor elements varies.

10. Movable index line mechanism comprising a base, first and second line anchor elements, a variable-length line element stretched between said anchor elements, first guide means on said base carrying said first anchor element for movement thereof in a circular path, second guide means on said base carrying said second anchor element for independent movement thereof in said circular path, and rotational drive means on said base connected to both guide means operably for effecting conjoint opposite movement thereof by equal amounts, thereby to shift said variable-length line element parallel to itself through successive parallel chordally extending positions relative to said circular path.

11. The mechanism defined in claim 10, wherein the base includes a fixed portion and a portion movable around said circular path relative to said fixed portion, the first and second guide means and the rotational drive means being carried bodily by said movable base portion, whereby rotational movement imparted to said movable base portion effects conjoint rotational movement of both guide means independently of their relatively rotated positions.

12. Movable index line mechanism comprising a base, first and second line anchor elements, a variable-length line element stretched between said anchor elements, means on said base guiding said anchor elements to permit independent movement thereof in a common circular path and coordination means on said base rotationally interconnecting said guided anchor elements positively for effecting rotational movement of one thereof by movement of the other thereof by an equal amount but in the opposite sense, thereby to shift said variable-length line element parallel to itself through successive parallel chordally extending positions relative to said circular path.

13. The mechanism defined in claim 12, wherein the coordination means comprises gearing including a pair of ring gears extending around the circular path and revolvable therearound carrying the respective anchor elements therewith, and pinion gearing rotationally interconnecting said ring gears to impel one thereof to equal and opposite rotation relative to the other.

14. The mechanism defined in claim 12, wherein the variable-length line element comprises a flexible line and a spring-loaded take-up reel associated physically in fixed relationship with one of the anchor elements, such anchor element serving as a line guide through which the line passes to the other anchor element from said take-up reel.

15. The mechanism defined in claim 12, wherein the base includes a fixed portion and a portion movable around said circular path relative to said fixed portion, the guide means and the coordination means being carried bodily by said movable base portion, whereby rotational movement imparted to said movable base portion effects conjoint rotational movement of both anchor elements independently of their relatively rotated positions.

16. In combination with a radar indicating panel of the type having a cathode ray tube screen mounted therein, movable index line mechanism comprising a base on said panel, first and second line anchor elements, a variable-length line element stretched between said anchor elements, means on said base guiding said anchor elements to permit independent movement thereof in a common circular path surrounding and concentric to said screen and coordination means on said base rotationally interconnecting said guided anchor elements positively for effecting rotational movement of one thereof by movement of the other thereof by an equal amount but in the opposite sense, thereby to shift said variable-length line element parallel to itself through successive parallel chordally extending positions relative to said circular path and screen.

17. The mechanism defined in claim 16, wherein the base includes a fixed portion and a portion movable around said circular path relative to said fixed portion, the guide means and the coordination means being carried bodily by said movable base portion, whereby rotational movement imparted to said movable base portion effects conjoint rotational movement of both anchor elements independently of their relatively rotated positions.

18. In combination with a radar indicator panel having a cathode ray tube indicator screen mounted therein, movable index line mechanism comprising a base in said panel, a pair of circular guide members rotatively carried by said base for rotation thereon about a common axis concentric to said indicator screen, variable-length index line means including anchor element carired by the respective circular guide members in a common locus circle centered at said axis, and a variable-length line element stretched tautly between said anchor elements, and rotational drive means connected to both of said circular guide members operably to effect conjoint rotation thereof oppositely by equal amounts for moving said anchor elements equally and oppositely in said common locus circle, whereby said line element shifts in translation parallel to itself as a movable chord to such circle and radar indicator screen.

19. The mechanism defined in claim 18, wherein the circular guide members comprise ring gears and the rotational drive means comprises pinion gearing meshed with said ring gears, and a member for driving said pinion gearing.

20. The mechanism defined in claim 18, wherein the rotational drive means effecting conjoint opposite rotation of the circular guide members is disengageable therefrom to permit conjoint rotation thereof in the same sense, and independently operated rotational drive means releasably engageable with the circular guide members operably to effect conjoint rotation thereof in the same sense.

References Cited in the file of this patent

UNITED STATES PATENTS

| Number | Name | Date |
|---|---|---|
| 2,540,110 | Gall | Feb. 6, 1951 |

FOREIGN PATENTS

| Number | Country | Date |
|---|---|---|
| 601,055 | Great Britain | Apr. 27, 1948 |